United States Patent
Chu

(10) Patent No.: US 11,724,324 B2
(45) Date of Patent: Aug. 15, 2023

(54) WIRE ELECTRICAL DISCHARGE MACHINE AND WIRE ELECTRICAL DISCHARGE MACHINING METHOD

(71) Applicant: FANUC CORPORATION, Minamitsuru-gun (JP)

(72) Inventor: Fuchen Chu, Yamanashi-ken (JP)

(73) Assignee: FANUC CORPORATION, Yamanashi-Ken (JP)

( * ) Notice: Subject to any disclaimer, the term of this patent is extended or adjusted under 35 U.S.C. 154(b) by 756 days.

(21) Appl. No.: 16/811,780

(22) Filed: Mar. 6, 2020

(65) Prior Publication Data

US 2020/0290142 A1 Sep. 17, 2020

(30) Foreign Application Priority Data

Mar. 12, 2019 (JP) ................................. 2019-044918

(51) Int. Cl.
*B23H 7/20* (2006.01)
*B23H 7/02* (2006.01)
(Continued)

(52) U.S. Cl.
CPC ............... *B23H 7/20* (2013.01); *B23H 1/02* (2013.01); *B23H 7/02* (2013.01); *B23H 7/18* (2013.01);
(Continued)

(58) Field of Classification Search
CPC ... B23H 7/20; B23H 1/02; B23H 7/02; B23H 7/32; B23H 7/065; G05B 2219/45043
See application file for complete search history.

(56) References Cited

U.S. PATENT DOCUMENTS 4,837,415 A 6/1989 Magara et al.
5,021,622 A * 6/1991 Magara .................. B23H 7/065
219/69.12
(Continued)

FOREIGN PATENT DOCUMENTS

EP 0 521 193 A2 1/1993
EP 1652610 A2 * 5/2006 ............... B23H 7/04
(Continued)

OTHER PUBLICATIONS

Extended European Search Report dated Jul. 30, 2020, for European Patent Application No. 20162029.1.

*Primary Examiner* — Geoffrey S Evans
(74) *Attorney, Agent, or Firm* — McGinn I.P. Law Group, PLLC.

(57) ABSTRACT

A wire electrical discharge machine performs electrical discharge machining on a workpiece by applying voltage across an electrode gap formed between a wire electrode and the workpiece to thereby generate electrical discharge while moving the wire electrode relative to the workpiece along a path specified by a machining program. The wire electrical discharge machine includes: a voltage detector for detecting a gap voltage across the gap; a facing area calculation unit for calculating, as a facing area, the area of a surface of the workpiece contained within a predetermined distance from the center axis of the wire electrode; an axis feed rate determination unit for determining an axis feed rate based on the gap voltage value detected by the voltage detector, and the facing area; and a movement control unit for performing control so that the wire electrode moves relative to the workpiece at the axis feed rate.

20 Claims, 16 Drawing Sheets

(51) Int. Cl.
*B23H 1/02* (2006.01)
*B23H 7/18* (2006.01)
*B23H 7/32* (2006.01)
*G05B 19/414* (2006.01)
*B23K 9/095* (2006.01)

(52) U.S. Cl.
CPC ............ *B23H 7/32* (2013.01); *G05B 19/414* (2013.01); *B23H 2200/00* (2013.01); *B23K 9/0953* (2013.01); *G05B 2219/45043* (2013.01); *G05B 2219/45221* (2013.01)

(56) References Cited

U.S. PATENT DOCUMENTS

| | | |
|---|---|---|
| 2003/0098294 A1 | 5/2003 | Goto et al. |
| 2006/0091113 A1 | 5/2006 | Hiraga et al. |
| 2010/0187204 A1* | 7/2010 | Angelella ................ B23H 7/06 219/69.13 |
| 2011/0100959 A1* | 5/2011 | Onodera ................ B23H 7/065 219/69.13 |
| 2015/0239055 A1 | 8/2015 | Niu et al. |
| 2015/0266122 A1 | 9/2015 | Nakagawa et al. |
| 2018/0281091 A1 | 10/2018 | Nakashima |

FOREIGN PATENT DOCUMENTS

| | | |
|---|---|---|
| EP | 2 272 614 A2 | 1/2011 |
| JP | 2003-165030 A | 6/2003 |
| JP | 2015-160263 A | 9/2015 |
| JP | 2018-169934 A | 11/2018 |
| WO | WO 2015/087389 | 6/2015 |

* cited by examiner

WIRE ELECTRICAL DISCHARGE MACHINE AND WIRE ELECTRICAL DISCHARGE MACHINING METHOD

CROSS-REFERENCE TO RELATED APPLICATION

This application is based upon and claims the benefit of priority from Japanese Patent Application No. 2019-044918 filed on Mar. 12, 2019, the contents of which are incorporated herein by reference.

BACKGROUND OF THE INVENTION

Field of the Invention

The present invention relates to a wire electrical discharge machine and a wire electrical discharge machining method for performing electrical discharge machining on a workpiece by causing an electrical discharge between a wire electrode and the workpiece.

Description of the Related Art

In a wire electrical discharge machine, in order to obtain a desired shape, it is essential to keep the gap distance between the electrode and the workpiece constant during machining. Since the gap voltage and the gap distance have a proportional relationship, in actual machining, in order to keep the gap distance constant, the axis feed rate is controlled so as to machine the workpiece while maintaining a constant gap voltage. However, when machining a workpiece along a corner-shaped curved path, the proportional coefficient between the gap voltage and the gap distance is not the same as that in machining the workpiece along a straight path, so that performing the above control without change brings about degradation in shape accuracy, compared to the case of machining along the straight path. To solve this problem, in order to keep improved machining accuracy regardless of the difference in geometry of portions of the workpiece to be machined, Japanese Laid-Open Patent Publication No. 2003-165030 discloses a method and the like for controlling the removal amount of material in machining by changing the pause time of electrical discharging upon machining the workpiece along a corner-shaped curved path.

SUMMARY OF THE INVENTION

However, with the above-described conventional technique of changing the machining condition by focusing only on the difference in geometry of portions to be machined of the workpiece, it has been impossible to improve the machining accuracy when machining the workpiece along a corner-shaped curved path by maintaining a constant gap distance.

It is therefore an object of the present invention to provide a wire electrical discharge machine and a wire electrical discharge machining method, capable of performing high-precision machining regardless of the geometry of a machining portion of a workpiece.

A first aspect of the present invention resides in a wire electrical discharge machine for performing electrical discharge machining on a workpiece by applying voltage across an electrode gap formed between a wire electrode and the workpiece to thereby generate electrical discharge while moving the wire electrode relative to the workpiece along a path specified by a machining program, including: a voltage detector configured to detect a gap voltage across the electrode gap; a facing area calculation unit configured to calculate, as a facing area, the area of a surface of the workpiece that is contained within a predetermined distance from the center axis of the wire electrode; an axis feed rate determination unit configured to determine an axis feed rate based on the value of the gap voltage detected by the voltage detector, and the facing area; and a movement control unit configured to perform control so that the wire electrode moves relative to the workpiece at the axis feed rate.

A second aspect of the present invention resides in a wire electrical discharge machining method for performing electrical discharge machining on a workpiece by applying voltage across an electrode gap formed between a wire electrode and the workpiece to thereby generate electrical discharge while moving the wire electrode relative to the workpiece along a path specified by a machining program, including: a facing area calculation step of calculating, as a facing area, the area of a surface of the workpiece that is contained within a predetermined distance from the center axis of the wire electrode; an axis feed rate determination step of determining an axis feed rate based on the value of a gap voltage detected by a voltage detector configured to detect the gap voltage across the electrode gap, and the facing area; and a movement control step of performing control so that the wire electrode moves relative to the workpiece at the axis feed rate.

According to the present invention, it is possible to implement high-precision machining regardless of the geometry of a portion to be machined of a workpiece.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A wire electrical discharge machine and a wire electrical discharge machining method according to the present invention will be detailed below by describing a preferred embodiment with reference to the accompanying drawings.

Embodiment

Figure 1:
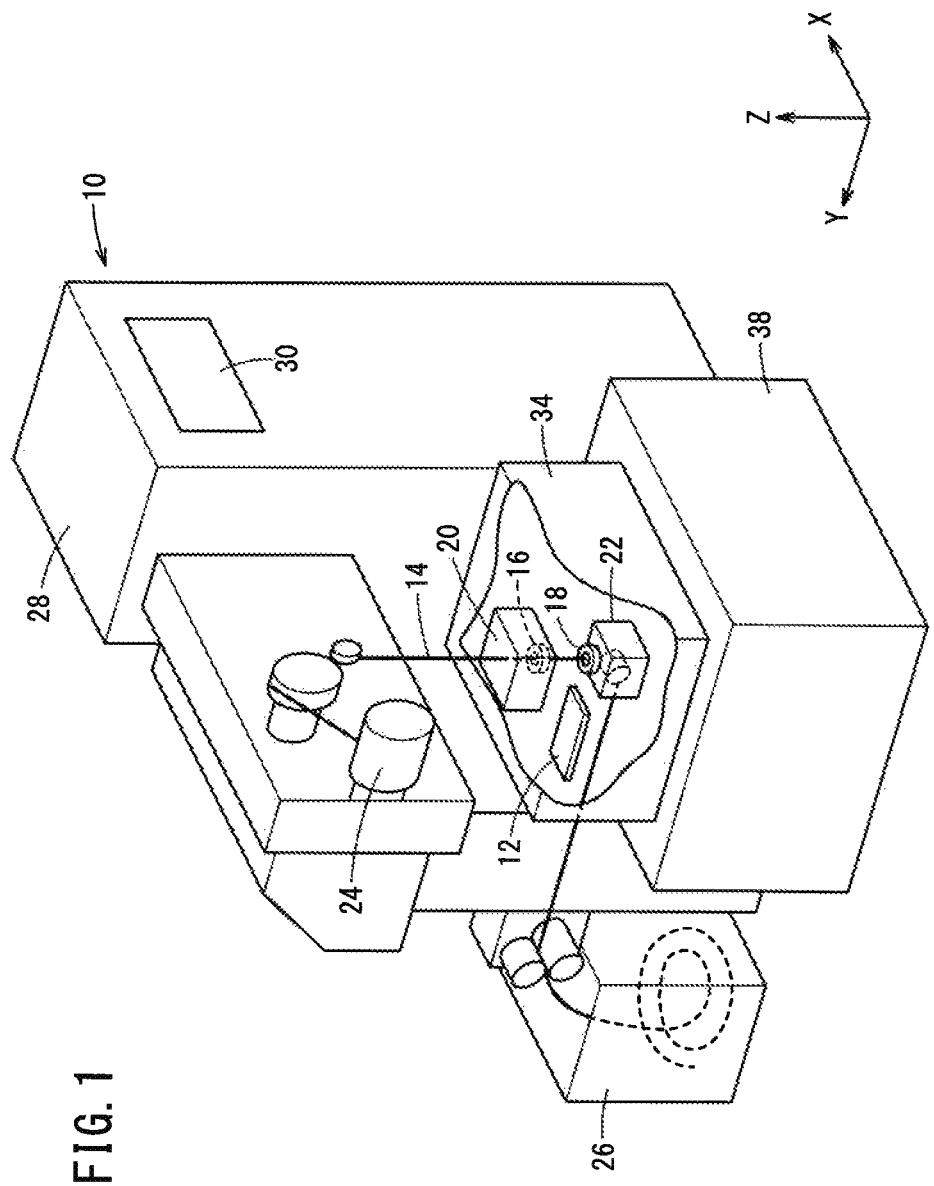
FIG. 1 is a schematic configuration diagram of a wire electrical discharge machine according to an embodiment.

FIG. 1 is a schematic configuration diagram of a wire electrical discharge machine 10 according to an embodiment. The wire electrical discharge machine 10 performs electrical discharge machining on a workpiece (not shown in FIG. 1) by applying voltage between an electrode gap between a wire electrode 14 and the workpiece while moving the wire electrode 14 relative to the workpiece set on a table 12 along a path specified by a predetermined machining program.

The wire electrical discharge machine 10 includes an upper wire guide 16 that supports the wire electrode 14 on the upper side of the table 12 (on the Z-axis positive side), a lower wire guide 18 that supports the wire electrode 14 on the lower side of the table 12 (on the Z-axis negative side), an upper guide block 20 in which the upper wire guide 16 is installed, and a lower guide block 22 in which the lower wire guide 18 is installed. The wire electrode 14 supplied from a wire bobbin 24 in a feed-out direction at a predetermined rate, runs through the upper wire guide 16 and the lower wire guide 18 and is collected into a collection box 26. The wire electrical discharge machine 10 further includes a machining power supply 28 for supplying voltage across the electrode gap, and a numerical controller (CNC) 30. The numerical controller 30 has a processor such as a CPU and a memory. The processor executes a program stored in the memory to thereby function as the numerical controller 30 of the present embodiment. The X-axis, Y-axis and Z-axis shown in FIG. 1 are orthogonal to each other, and gravity acts in the Z-axis negative direction.

The table 12, the workpiece (not shown in FIG. 1), the upper wire guide 16 and the upper guide block 20, the lower wire guide 18 and the lower guide block 22 are accommodated in a work-pan 34 filled with a dielectric working fluid. Wire electrical discharge machining is performed under this condition. The work-pan 34 is set on a bed 38.

Figure 2:
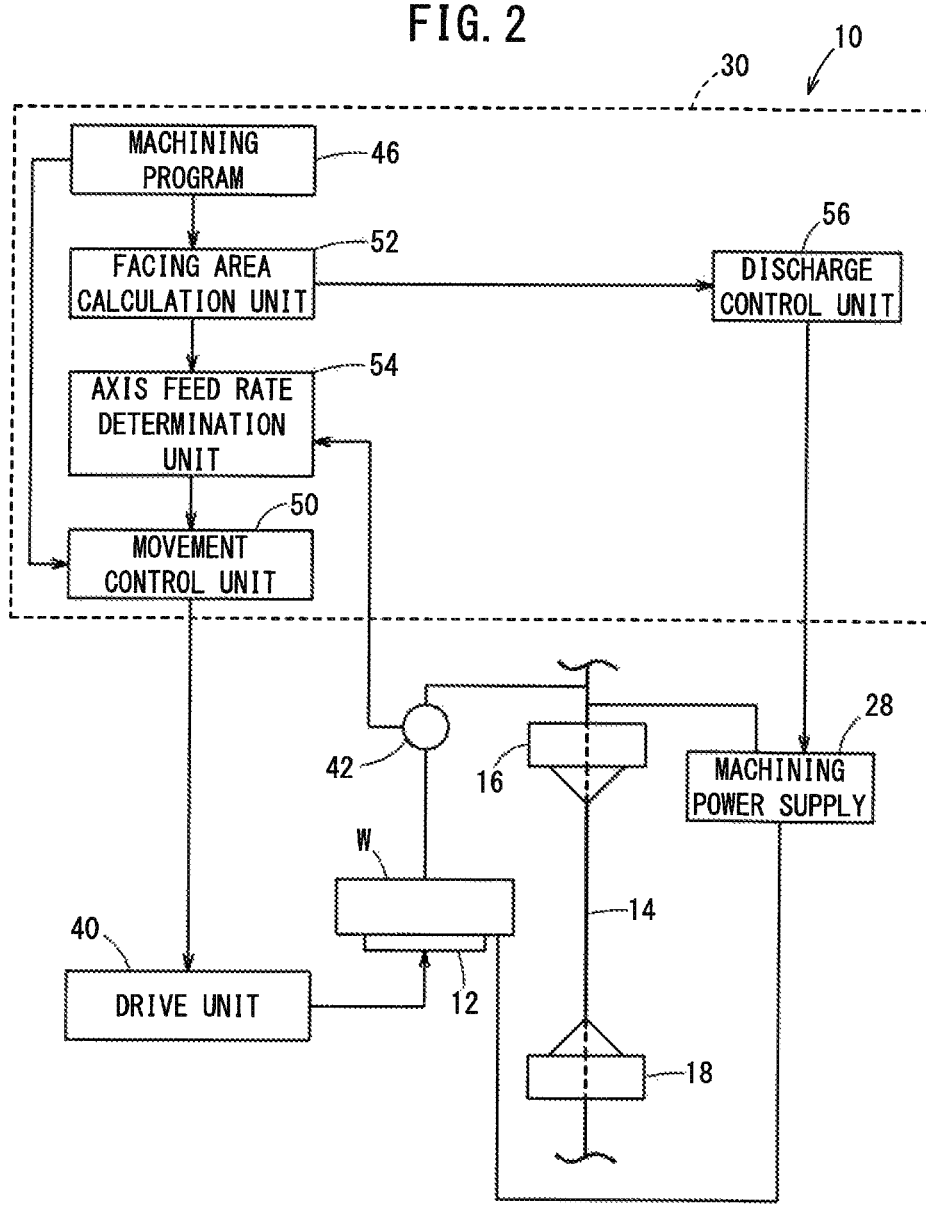
FIG. 2 is a functional block diagram of the wire electrical discharge machine in the embodiment.

FIG. 2 is a functional block diagram of the wire electrical discharge machine 10 according to the embodiment. In FIG. 2, some part of the configuration of the wire electrical discharge machine 10 shown in FIG. 1 is omitted. Instead, a drive unit 40 and a voltage detector 42 which are also constituents of the wire electrical discharge machine 10 but are not shown in FIG. 1, are shown.

The drive unit 40 drives the table 12 to move the wire electrode 14 in the X-axis direction and the Y-axis direction relative to the workpiece W. The drive unit 40 includes motors (not shown), motor encoders (not shown) and drive transmission mechanisms (not shown). The motors are provided for moving the table 12 in the X-axis direction and the Y-axis direction. The drive transmission mechanisms each include a ball screw, a nut built in the table 12 and others to convert rotational motion of the motors for the X-axis direction and the Y-axis direction, into linear motion of the table 12 in the X-axis direction and Y-axis direction.

Note that a drive unit for driving the upper guide block 20 and the lower guide block 22 may be provided instead of the drive unit 40. Alternatively, a drive unit for driving the upper guide block 20 and the lower guide block 22 may be provided in addition to the drive unit 40. The voltage detector 42 detects the gap voltage across the electrode gap between the wire electrode 14 and the workpiece W.

The numerical controller 30 includes a machining program 46 stored in a storage device (not shown), a movement control unit 50, a facing area calculation unit 52, an axis feed rate determination unit 54 and a discharge control unit 56.

The movement control unit 50 controls the drive unit 40 for driving the table 12 with the workpiece W supported thereon so as to move the wire electrode 14 relative to the workpiece W along a path (machining path) specified by the machining program 46, at an axis feed rate determined by the axis feed rate determination unit 54.

The facing area calculation unit 52, based on the machining program 46, calculates the area of a surface of the workpiece W contained within a predetermined distance from the center axis of the wire electrode 14, as the facing area. The facing area calculation unit 52 computes the shape of the workpiece W formed by the previous finish-machining or rough machining, based on the gap voltage and the number of electrical discharges, which are constantly monitored, during machining. Further, based on the present position of the center axis of the wire electrode 14 obtained from the machining program 46, the facing area calculation unit 52 computes the present shape of the workpiece W being formed by the in-progress finish-machining. In the following, the finish-machining or the rough machining performed last time is referred to as previous machining, and the finish-machining performed in progress is referred to as present machining. Then, the facing area calculation unit 52, based on the computed, present shape of the workpiece W, calculates the facing area as viewed from the center axis of the wire electrode 14 in a calculation cycle determined in advance by the numerical controller 30. Next, the definition of the facing area and the necessity of control according to the facing area will be described.

Figure 3:
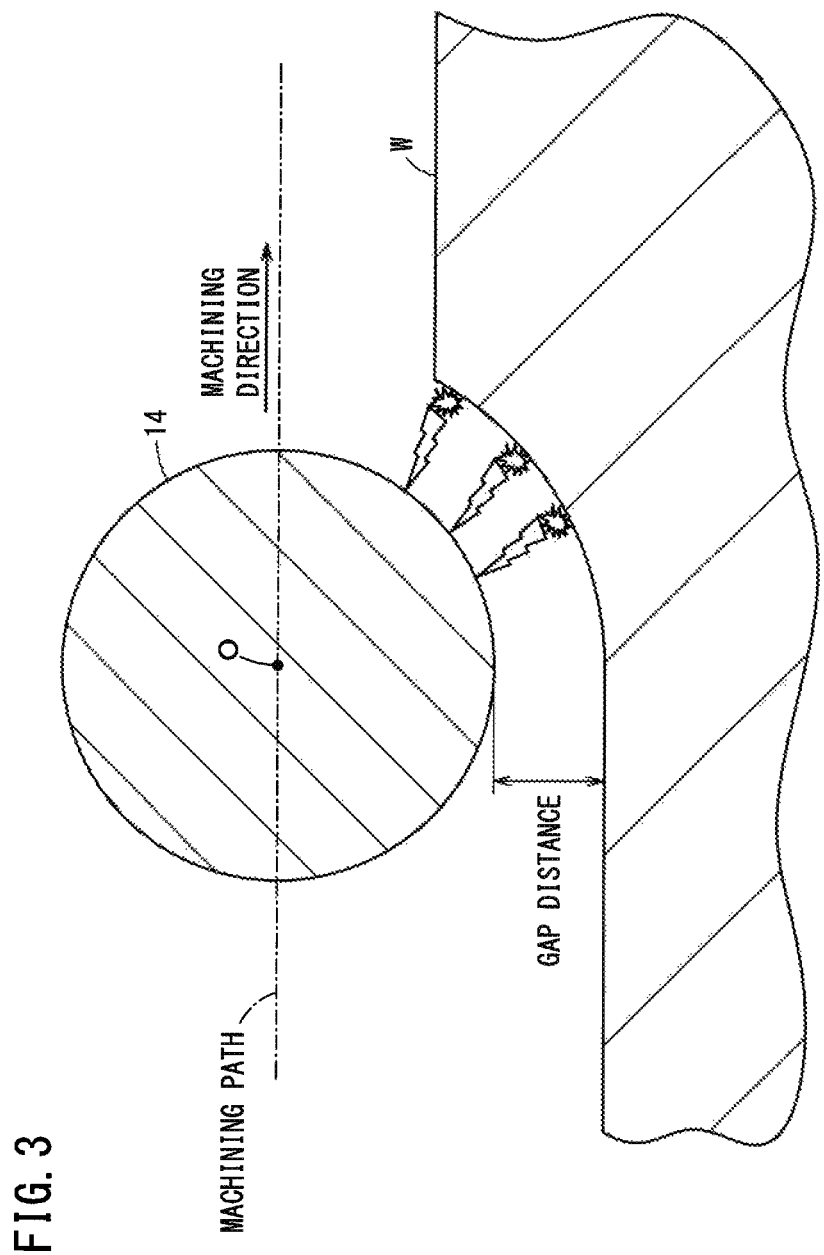
FIG. 3 is a sectional view of a relationship between a wire electrode and a workpiece, viewed in a direction of a center axis of the wire electrode (Z-axis direction)

FIG. 3 is a sectional view of a relationship between the wire electrode 14 and the workpiece W viewed from the direction of the center axis O of the wire electrode 14 (Z-axis direction). In wire electrical discharge machining, when performing electrical discharge machining, the wire electrode 14 and the workpiece W have a positional relationship as shown in FIG. 3. The center axis O of the wire electrode 14 moves relative to the workpiece in the machining direction along the machining path.

Figure 4:
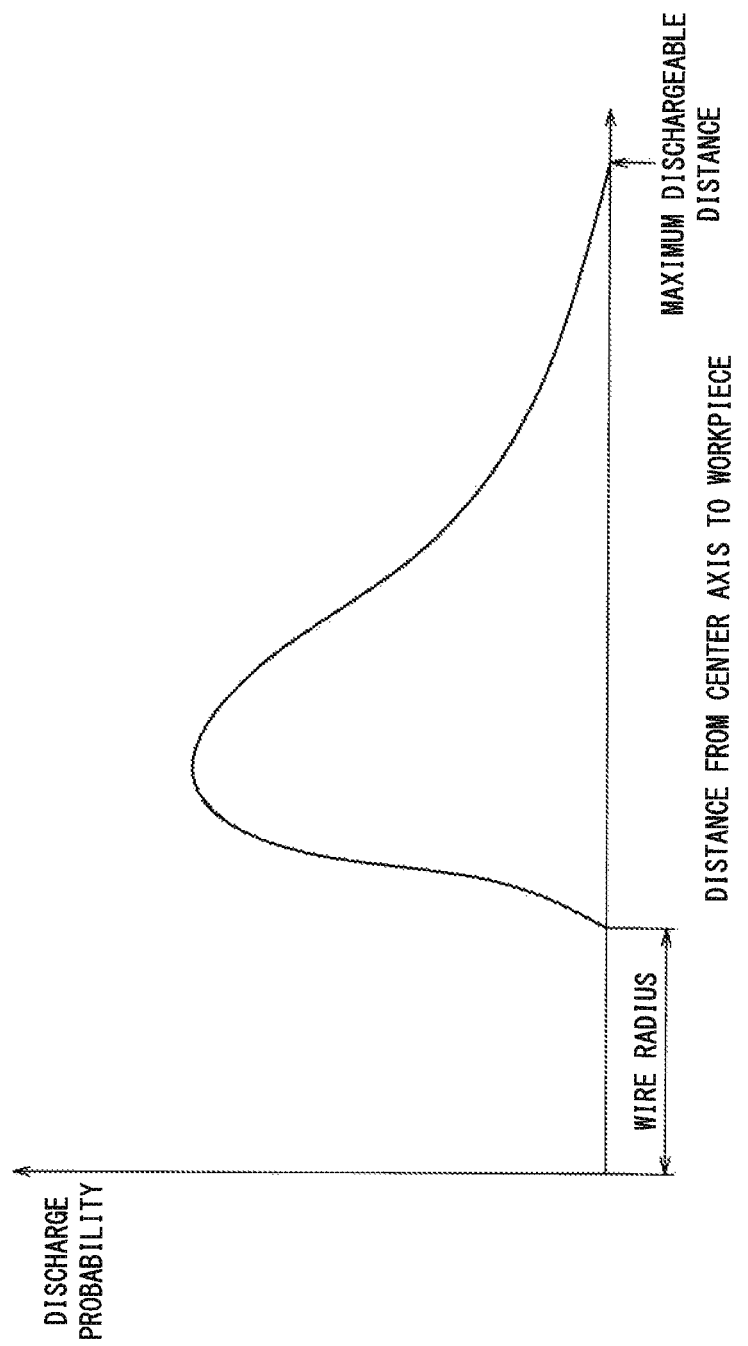
FIG. 4 is a diagram showing a relationship between the distance from the center axis of a wire electrode to a workpiece and the discharge probability.

FIG. 4 is a diagram showing a relationship between the distance from the center axis O of the wire electrode 14 to the workpiece W and the discharge probability. The horizontal axis in FIG. 4 shows the distance from the center axis O of the wire electrode 14 to the workpiece W, whereas the vertical axis shows the discharge probability, which is the probability of electrical discharge occurring across the electrode gap. Depending on the distance from the center axis O to the workpiece W, the discharge probability varies as shown in FIG. 4. The distance from the center axis O to the workpiece W is a value obtained by adding the distance between the electrode and the workpiece (the gap distance) to the wire radius of the wire electrode 14. The maximum distance between the center axis O and the workpiece W, at which an electrical discharge can be caused across the electrode gap, is called the maximum dischargeable distance. In the present embodiment, the area of a surface of the workpiece W that is contained within the maximum dischargeable distance from the center axis O of the wire electrode 14 is defined as the facing area.

Figure 5:
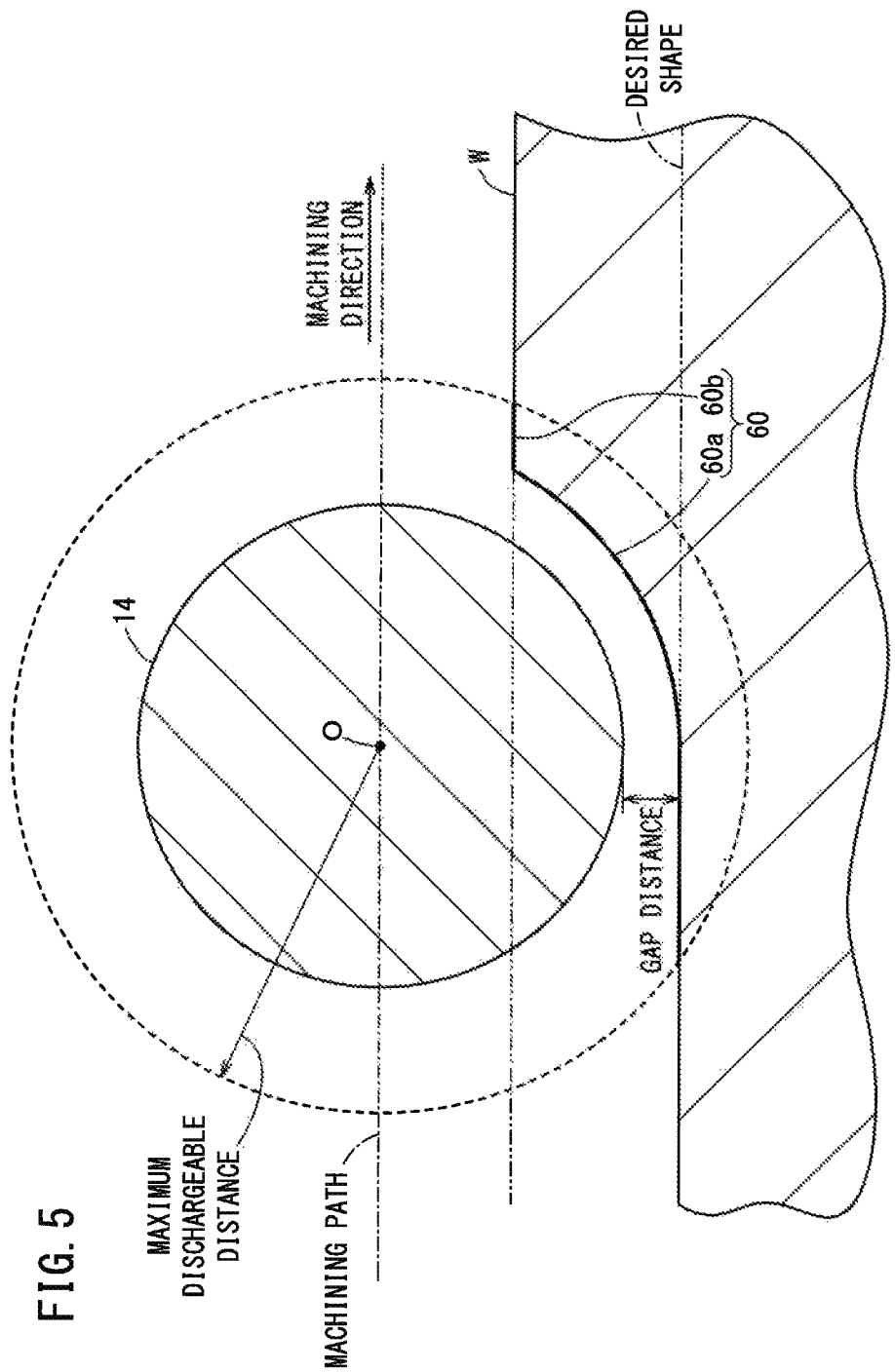
FIG. 5 is a sectional view illustrating a facing area when a machining path is a straight line.

FIG. 5 is a sectional view for explaining the facing area when a machining path is a straight line. FIG. 5 is a sectional view showing the wire electrode 14 and the workpiece W viewed from the direction of the center axis O of the wire electrode 14 (Z-axis direction). In this drawing, the two-dot chain line shows a desired shape (straight line) that is to be formed in the present machining. The center axis O of the wire electrode 14 moves linearly in the machining direction along the machining path specified by the machining program 46. The facing area defined as above is the area of a surface of the workpiece W that is contained within a circle having the center axis O of the wire electrode 14 as its center with a radius of the maximum dischargeable distance. The surface, designated at 60, of the workpiece W is a calculation target to be calculated as the facing area, and includes a surface 60a of the workpiece W being machined by the present machining and a surface 60b of the workpiece W that has been machined by the previous machining.

Figure 6:
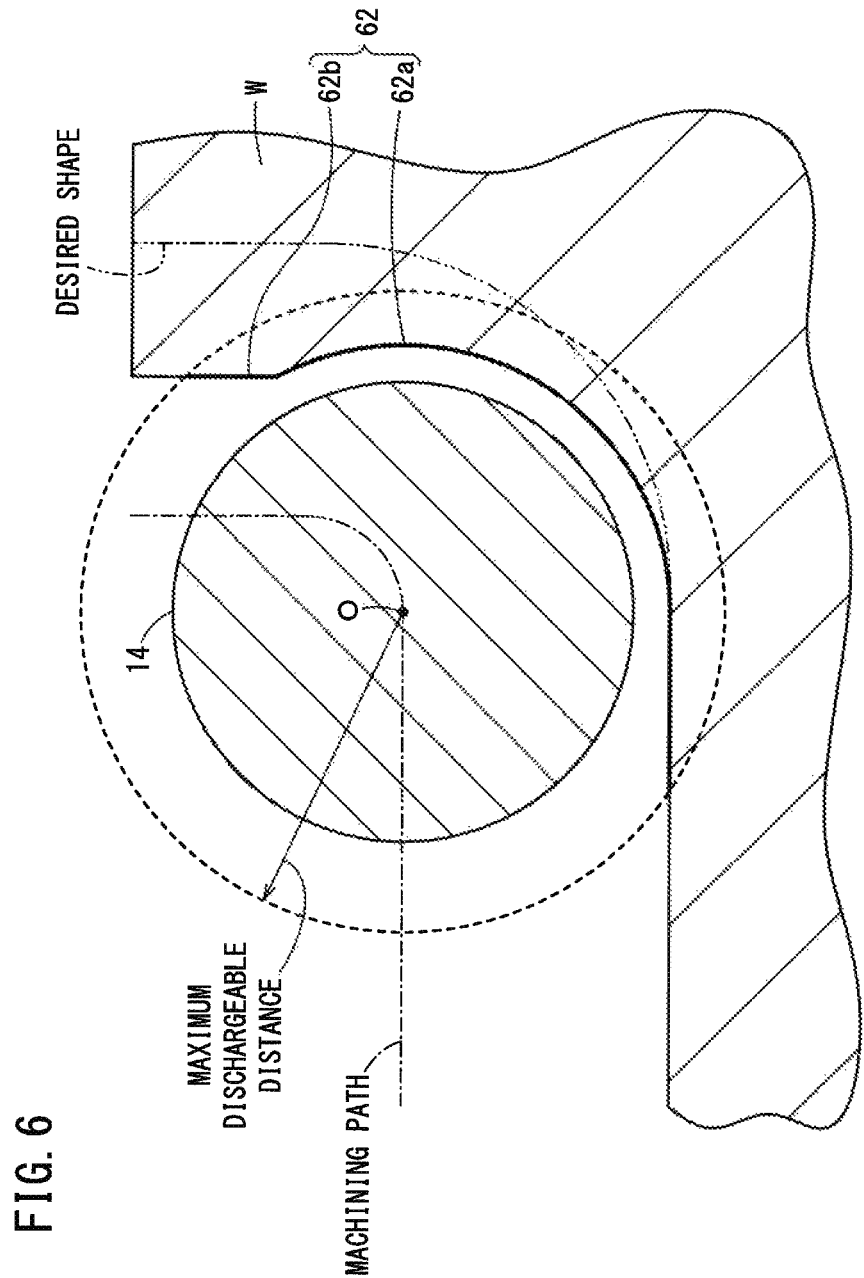
FIG. 6 is a sectional view illustrating a facing area when a machining path is a curved line.

FIG. 6 is a sectional view for explaining the facing area when a machining path is a curved line. FIG. 6 is a sectional view showing the wire electrode 14 and the workpiece W viewed from the direction of the center axis O of the wire electrode 14 (Z-axis direction). In the drawing, the two-dot chain line shows a desired shape (inner-corner-shaped curve) that is to be formed with the present machining. The center axis O of the wire electrode 14 is moved while changing its moving direction along the curved machining path specified by the machining program 46. The surface, designated at 62, of the workpiece W is a calculation target to be calculated as the facing area, and includes a surface 62a of the workpiece W being machined by the present machining and a surface 62b of the workpiece W that has been machined by the previous machining. It is understood that the facing area when machining the workpiece W along the inner-corner-shaped curve as shown in FIG. 6 is larger than the facing area when machining the workpiece W along a straight line as shown in FIG. 5.

Figure 7:
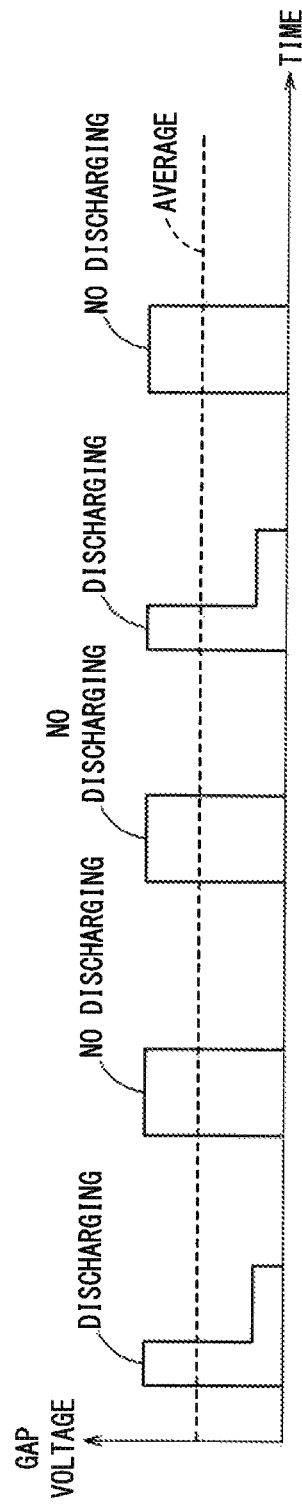
FIG. 7 is a diagram showing a temporal change of the gap voltage when a machining path is a straight line.
Figure 8:
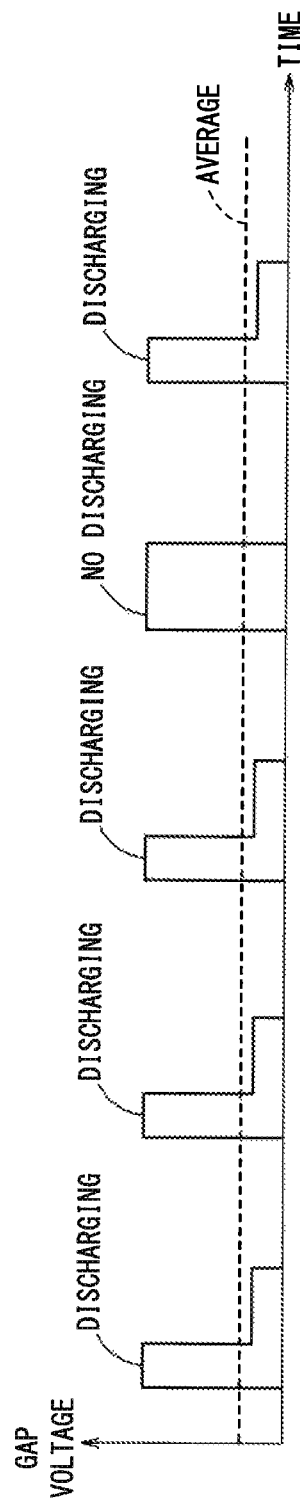
FIG. 8 is a diagram showing a temporal change of the gap voltage when a machining path is a curved line.

Next, a description will be given of change in discharge probability and change of the average of the gap voltage values within a predetermined period of time, depending on the change of the facing area. Hereinafter, the above average is simply referred to as the average gap voltage. FIG. 7 is a diagram showing a temporal change of the gap voltage when the machining path is a straight line. FIG. 8 is a diagram showing a temporal change of the gap voltage when the machining path is a curved line. FIG. 7 corresponds to the case of machining the workpiece along a straight line as shown in FIG. 5, and FIG. 8 corresponds to the case of machining the workpiece along an inner-corner-shaped curve as shown in FIG. 6. In FIGS. 7 and 8, the horizontal axis represents time, and the vertical axis represents the gap voltage. In FIGS. 7 and 8, the voltage values of the voltage pulses applied across the electrode gap, the pause time between voltage pulses, and the axis feed rate are all fixed, and the machine is controlled so as to keep the axis feed rate at a predetermined constant value. When no discharge takes place, the voltage pulse remains in a rectangular waveform, but when a discharge occurs, the voltage pulse takes a waveform containing voltage dropping upon occurrence of the discharge. As can be seen from FIGS. 7 and 8, under the same conditions, the frequency of occurrence of electrical discharges is higher in the case of machining the workpiece along the inner-corner-shaped curve (i.e., in the case of having a larger facing area) than in the case of machining the workpiece along the straight line. As a result, when the axis feed rate is not controlled, the average gap voltage in machining the workpiece along the inner-corner-shaped curve is lower than that in machining the workpiece along the straight line.

Figure 9:
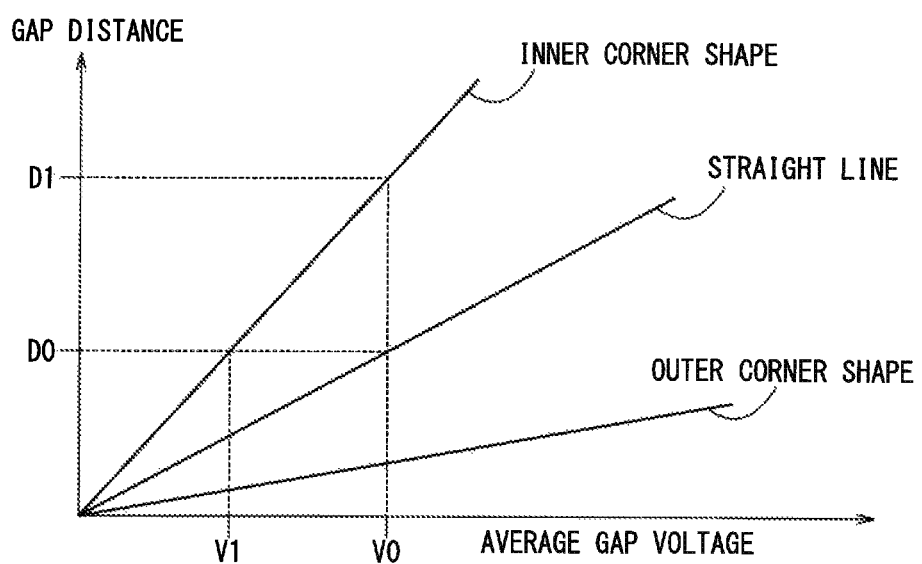
FIG. 9 is a diagram showing a relationship between the average of gap voltage values and the gap distance.

FIG. 9 is a diagram showing the relationship between the average gap voltage and the gap distance. The horizontal axis in FIG. 9 represents the average gap voltage, and the vertical axis represents the gap distance. In FIG. 9, the proportional relationship between the average gap voltage and the gap distance in the case of the straight machining path along the straight line is indicated by "straight line"; the proportional relationship between the average gap voltage and the gap distance in the case of the curved machining path along the inner-corner-shaped curve is indicated by "inner corner shape"; and the proportional relationship between the average gap voltage and the gap distance in the case of the curved machining path along the outer-corner-shaped curve is indicated by "outer corner shape". In the case of a constant average gap voltage, the gap distance tends to become greater in the order of the outer corner shape, the straight line and the inner corner shape.

In the conventional wire electrical discharge machine, which performs control to determine the axis feed rate so that the average gap voltage will take a predetermined target voltage without taking any account of the facing area, the axis feed rate is controlled to cause the average gap voltage to follow the target voltage independent of the facing area. Accordingly, if the average gap voltage in the case of machining the workpiece along the straight line shown in FIG. 7 is set as the predetermined target voltage to be used for controlling the axis feed rate, the axis feed rate, also in the case of machining the workpiece along the curved path shown in FIG. 8, is controlled such that the average gap voltage will take the same target voltage as that in FIG. 7. As a result, the gap distance in machining the workpiece along the inner-corner-shaped curve becomes greater than that in machining the workpiece along the straight line, as shown in FIG. 9, which means that the gap distance cannot be kept constant.

To deal with this, in the present embodiment, when the facing area changes due to change in the geometry and the machining path regarding portions to be machined of the workpiece W (i.e., changing from the straight-path machining to the curved-path machining), control of the axis feed rate is performed taking into account the facing area in addition to the average gap voltage, in order to keep the gap distance constant.

In FIG. 9, it is assumed that the predetermined target voltage value is V0, the average gap voltage in the straight-path machining is V0, and the gap distance in the straight-path machining is D0. At this time, if the workpiece is machined along the inner-corner-shaped curve with the target voltage uncompensated without taking into account the facing area as in the related art, the gap distance in machining the workpiece along the inner-corner-shaped curve comes to D1 which is greater than D0. That is, the gap distance cannot be kept at the constant value D0. On the other hand, in the present embodiment, when the geometry of a portion to be machined of the workpiece W changes from a straight line shape to an inner corner shape, the target voltage is compensated to be decreased from V0 to V1 in accordance with the amount of change (increase) of the facing area. As a result, even when machining the workpiece along the inner-corner-shaped curve, it is possible to improve machining accuracy by keeping the gap distance at the constant value D0. Further, when the geometry of a portion to be machined of the workpiece W changes from the straight line shape to an outer corner shape, the target voltage is compensated to be greater than V0 in accordance with the amount of change (decrease) of the facing area in order to keep the gap distance at D0. In this way, highly accurate finishing can be performed regardless of the geometry of a portion to be machined in the workpiece W.

The axis feed rate determination unit 54 determines the axis feed rate based on the gap voltage detected by the voltage detector 42 and the facing area calculated by the facing area calculation unit 52 as described above. The axis feed rate determination unit 54 determines the axis feed rate so that the average gap voltage coincides with the predetermined target voltage. Further, the axis feed rate determination unit 54 of the present embodiment compensates the target voltage to increase or decrease according to the change of the calculated value of the facing area.

Specifically, when the geometry of a portion to be machined of the workpiece W changes from a straight line shape to an inner or outer corner shape and the value of the facing area then changes from the value calculated for the straight machining path, the axis feed rate determination unit 54 compensates the target voltage to increase or decrease from the predetermined value, in accordance with the amount of change in the value of the facing area. For example, when the machining path becomes curved to machine the workpiece along an inner-corner-shaped curve and hence the facing area increases, the target voltage is compensated to decrease from the predetermined value as the facing area increases. On the other hand, when the machining path becomes curved to machine the workpiece along an outer-corner-shaped curve and hence the facing area decreases, the target voltage is compensated to increase from the predetermined value as the facing area decreases.

Figure 10:
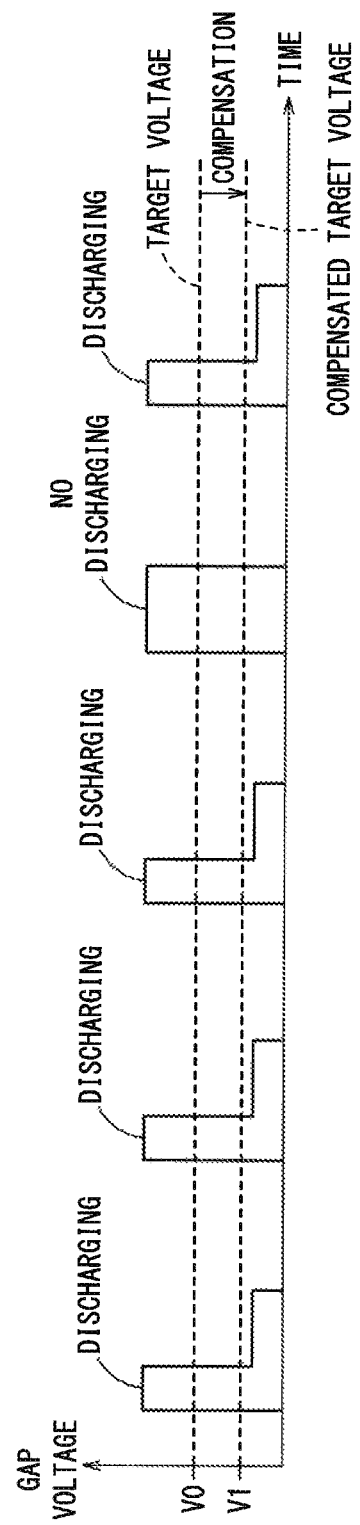
FIG. 10 is a diagram illustrating compensation of the target voltage when machining a workpiece along an inner-corner-shaped curve.
Figure 11:
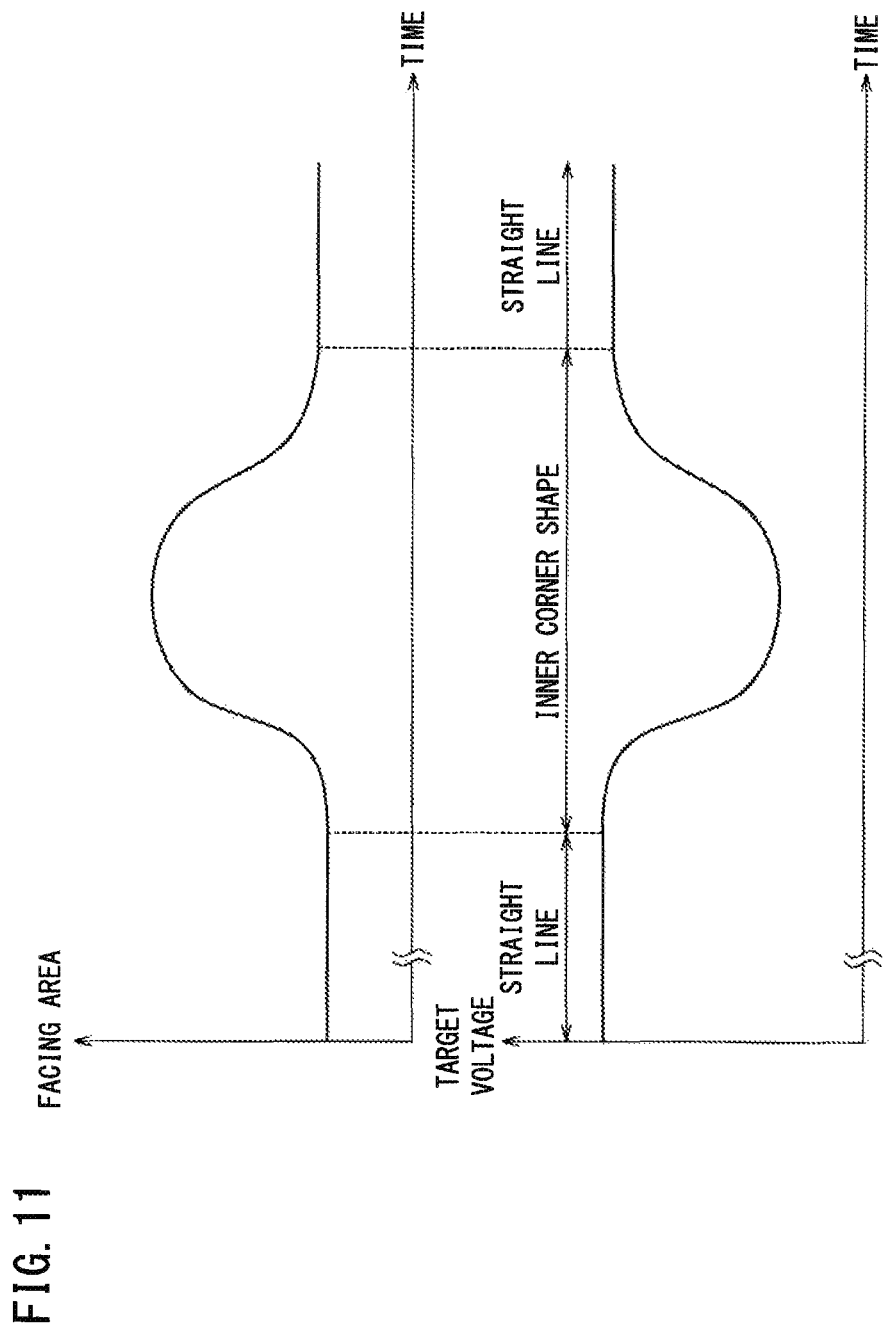
FIG. 11 is a diagram illustrating change in target voltage due to compensation in accordance with the facing area.

FIG. 10 is a diagram for explaining compensation of the target voltage when machining a workpiece along an inner-corner-shaped curve. The horizontal axis in FIG. 10 represents time, and the vertical axis represents the gap voltage. FIG. 11 is a diagram for explaining the change of the target voltage caused by compensation in accordance with the facing area. The upper graph of FIG. 11 shows change of the facing area with the passage of time, and the lower graph shows change of the target voltage being compensated as time passes.

When the facing area becomes greater than the value for machining the workpiece along the straight line, i.e., when the workpiece is machined along an inner-corner-shaped curve, the target voltage is compensated to be lower than the predetermined target voltage value as the facing area becomes greater, as shown in FIGS. 10 and 11. In particular, in a case shown in FIG. 10, the predetermined target voltage value V0 is compensated so that the compensated target voltage V1 coincides with the average value in FIG. 8. Then, the axis feed rate determination unit 54 determines the axis feed rate so that the average value of the gap voltage coincides with the compensated target voltage. As a result, the frequency of occurrence of electrical discharging in the case of machining the workpiece along the inner-corner-shaped curve can be kept higher than in the case of machining the workpiece along the straight line, so that it is possible to determine an appropriate axis feed rate in accordance with the facing area. Incidentally, as shown in FIG. 11, that when the geometry of a portion to be machined of the workpiece W returns from the inner corner shape to the straight line shape, the target voltage is reverted to the predetermined value.

The discharge control unit 56 controls the machining power supply 28 to thereby apply voltage pulses across the electrode gap at intervals of a predetermined pause time. When the geometry of a portion to be machined changes from a straight line shape to an inner corner shape and the facing area and the frequency of electrical discharging then increase as shown in FIGS. 6 and 8, the discharge repulsive force generated by the discharge increases. As a result, the risk of the wire electrode 14 being displaced or shifted from the machining path increases. To deal with this, the discharge control unit 56 changes the pause time as the facing area changes. Specifically, the pause time is made to be longer as the facing area increases. Thus, the frequency of receiving discharge repulsive force can be reduced, so that the wire electrode 14 can be prevented from being displaced. Conversely, when the geometry of a portion to be machined changes from a straight line shape to an outer corner shape, and the facing area and the frequency of occurrence of electrical discharging then decrease, the discharge repulsive force generated by the discharge decreases. In this case, the pause time may be shortened as the facing area becomes smaller.

Figure 12:
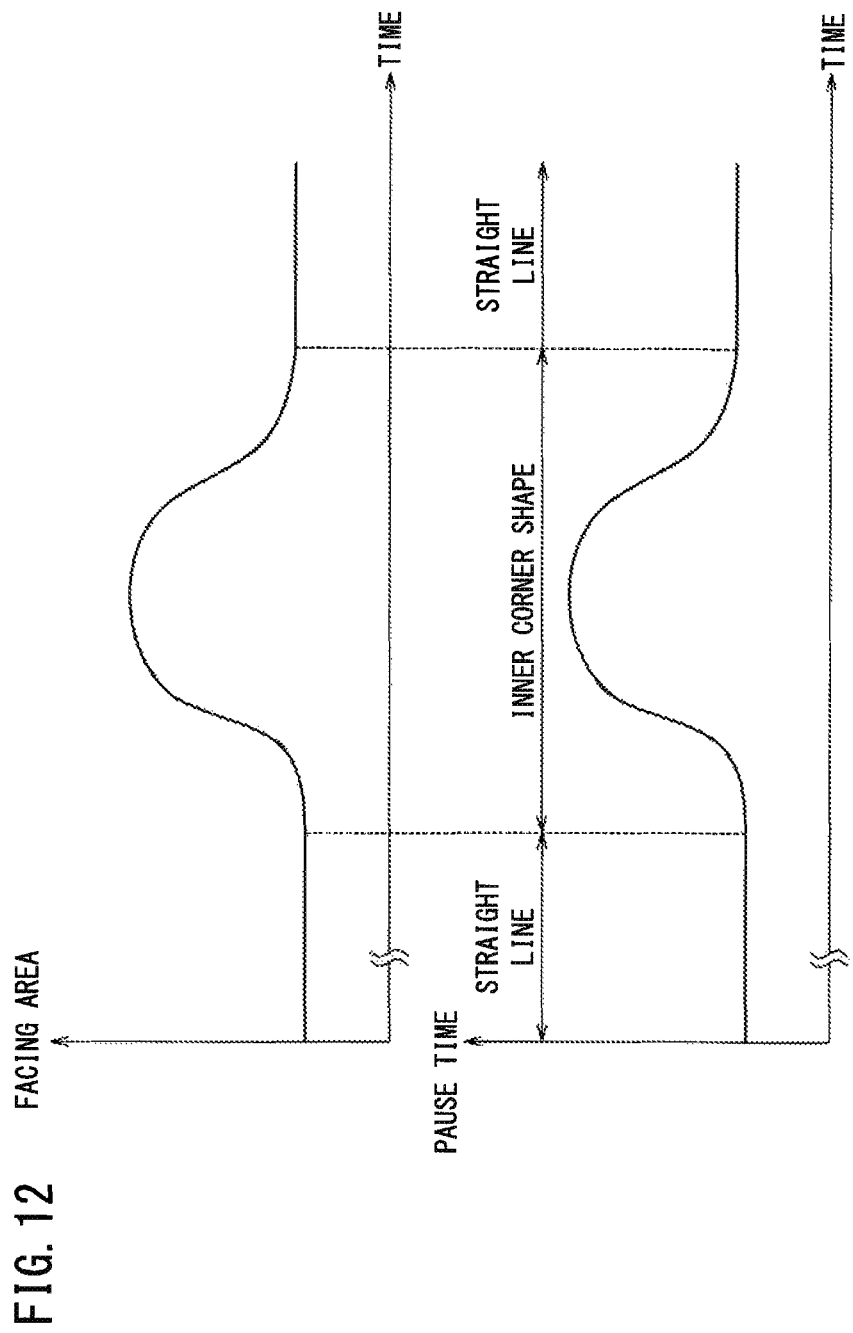
FIG. 12 is a diagram illustrating that a pause time is changed according to the facing area.

FIG. 12 is a diagram for explaining that the pause time is changed according to the facing area. The upper graph of FIG. 12 shows change of the facing area with the passage of time, and the lower graph shows change of the pause time as time passes. That is, when the geometry of a portion to be machined of the workpiece W changes from a straight line shape to an inner corner shape and the facing area then increases, the discharge control unit 56 adjusts the pause time to a value greater than the value for the straight-path machining. When the geometry of a portion to be machined of the workpiece W returns from the inner corner shape to the straight line shape, the pause time is reverted to the original value.

Figure 13:
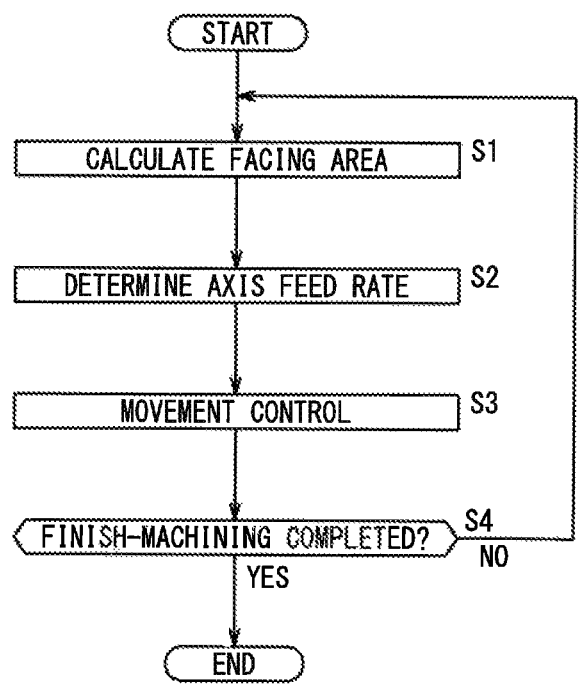
FIG. 13 is a flowchart illustrating a wire electrical discharge machining method according to the embodiment.

FIG. 13 is a flowchart for explaining a wire electrical discharge machining method according to the embodiment. The process of the flowchart in FIG. 13 is executed during finish machining.

First, the facing area calculation unit 52, based on the machining program 46, calculates the area of a surface of the workpiece W that is contained within the maximum dischargeable distance from the center axis O of the wire electrode 14, as the facing area, at the position of the center axis O of the wire electrode 14, in a cycle of a predetermined calculation period (step S1).

After step S1, the axis feed rate determination unit 54 determines the axis feed rate based on the gap voltage detected by the voltage detector 42 and the facing area obtained at step S1 (step S2). Specifically, when the geometry of a portion to be machined of the workpiece W changes and the value of the facing area then changes from the value calculated when the machining path is a straight line, the axis feed rate determination unit 54 compensates the target voltage so as to increase or decrease from the predetermined value, in accordance with the amount of change in the value of the facing area. Then, the axis feed rate determination unit 54 determines the axis feed rate so that the average gap voltage becomes equal to the compensated target voltage.

The gap voltage values to be used for calculation of the average value used for the determination of the axis feed rate at step S2 preferably include the gap voltage value detected by the voltage detector 42 when the wire electrode 14 resided at the positon of the center axis O, wherein that position was used by the facing area calculation unit 52 to calculate the facing area at step S1. However, this condition does not be necessarily have to be satisfied.

Following step S2, the movement control unit 50 causes the drive unit 40 to drive the table 12 and performs control to move the wire electrode 14 relative to the workpiece W along a path specified by the machining program 46 at the axis feed rate determined at step S2 (step S3).

After step S3, the movement control unit 50 determines whether or not the finish machining has been completed based on the machining program 46 (step S4), and steps S1 to S3 are repeated until the finish machining is completed. When it is determined that the finish machining has been completed (step S4: YES), the process is ended.

As described above, according to the wire electrical discharge machine 10, in determining the axis feed rate, the target voltage is compensated in accordance with change in the facing area. As a result, even if the geometry of a portion to be machined of the workpiece W changes between a straight line shape, and an inner corner shape, or an outer corner shape, the gap distance can be kept constant. Further, also in a portion to be machined where the machining path gradually changes from a straight line to a circular arc, or from a circular arc to a straight line, and also in a portion to be machined having a step, the gap distance can be kept constant by calculating the change in the facing area and compensating the machining conditions. As a result, it is possible to perform high-precision machining regardless of the geometry of a portion to be machined in the workpiece W. Though in the above embodiment the finish machining was exemplified, it is needless to say that the same effect can be obtained in rough machining.

Note that the machining conditions to be compensated in accordance with the facing area change may further include an offset of the center axis O with respect to the machining path, the ejection rate of the dielectric working fluid, and others.

Modifications

The above embodiment may be modified as follows.

Modification 1

Figure 14:
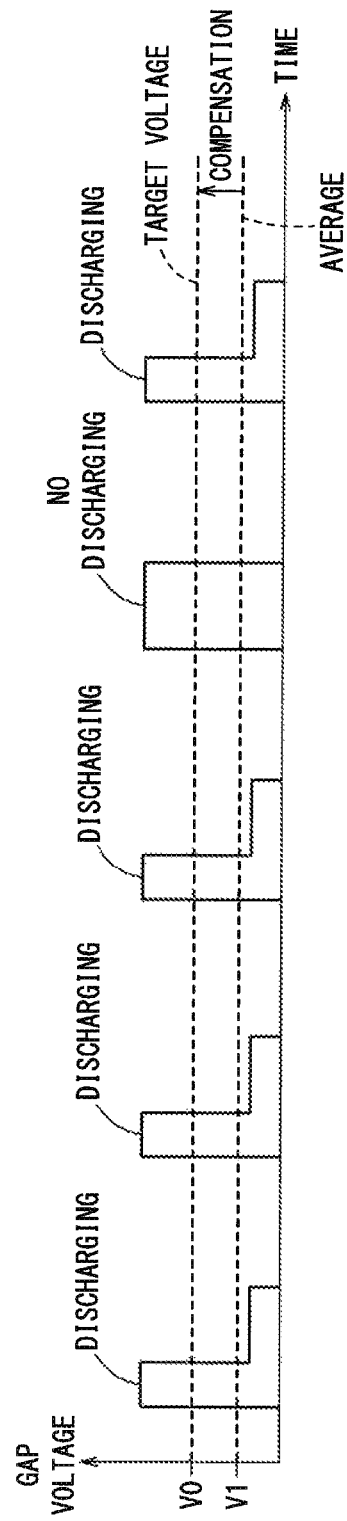
FIG. 14 is a diagram for explaining compensation of the gap voltage when an inner-corner-shaped curve is machined according to Modification 1.

FIG. 14 is a diagram for explaining compensation of the gap voltage when machining a workpiece along an inner-corner-shaped curve in Modification 1. The axis feed rate determination unit 54 of the above embodiment compensates the target voltage so as to increase or decrease according to the change of the value of the facing area. A similar effect can be obtained by compensating the gap voltage value so as to be increased or decreased according to the change of the value of the facing area. The axis feed rate determination unit 54 of Modification 1 also determines the axis feed rate so that the average gap voltage coincides with the predetermined target voltage, but the target voltage V0 is fixed at a predetermined value without compensation.

Then, when the geometry of a portion to be machined of the workpiece W changes from a straight line shape to an inner corner shape or an outer corner shape and the facing area then changes from the value calculated when the machining path is a straight line, the axis feed rate determination unit 54 performs compensation so that the gap voltage value detected by the voltage detector 42 increases or decreases as the facing area changes. That is, if, due to transition to the inner-corner-shaped-path machining, the facing area becomes larger than the value of the facing area in the straight-path machining, the gap voltage is compensated to be greater than the detected value as the facing area becomes larger, as shown in FIG. 14. In FIG. 14, the gap voltage is compensated so that the average of the compensated gap voltages becomes V0. Then, the axis feed rate determination unit 54 determines the axis feed rate so that the average of the compensated gap voltages becomes the target voltage V0. As a result, it is possible to determine an appropriate axis feed rate for the facing area by keeping the frequency of electrical discharging higher in the inner-corner-shaped-path machining than in the straight-path machining. Conversely, if, due to transition to the outer-corner-shaped-path machining, the facing area becomes smaller than the value of the facing area in the straight-path machining, the gap voltage is compensated to be lower than the detected value as the facing area becomes smaller.

Modification 2

Figure 15:
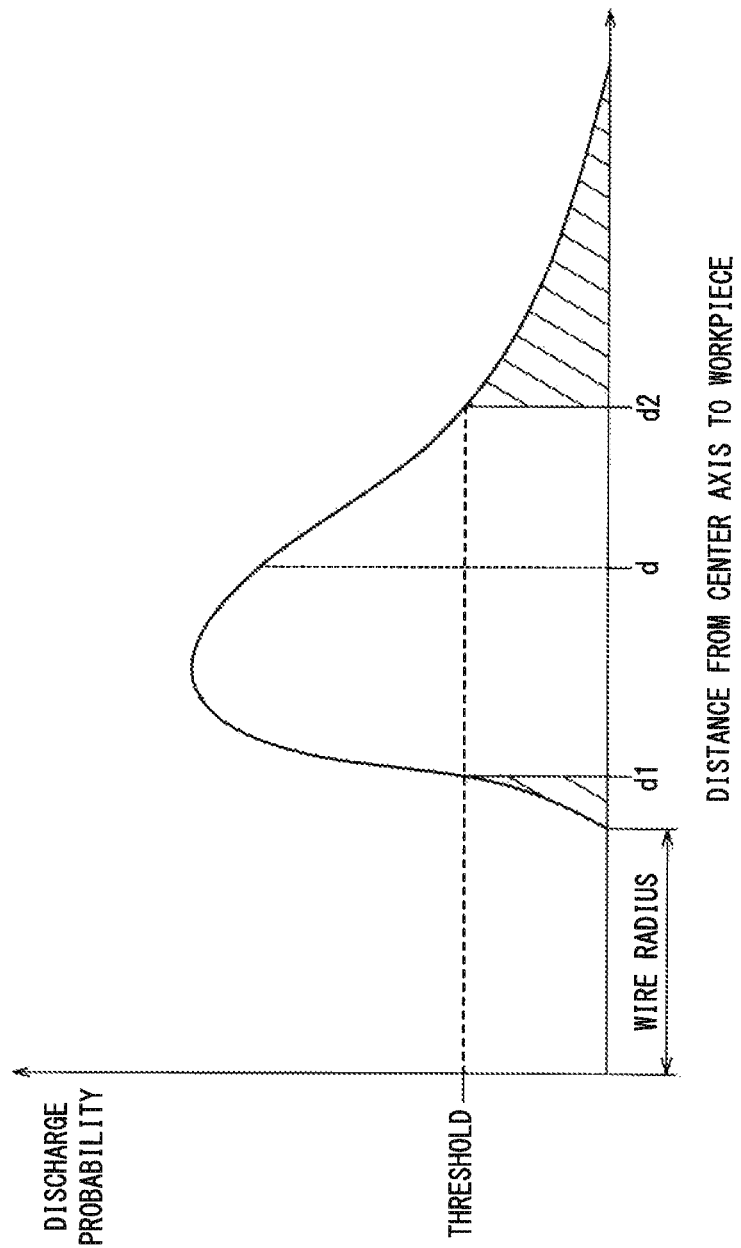
FIG. 15 is a diagram for explaining a predetermined distance used for defining the facing area in Modification 2.
Figure 16:
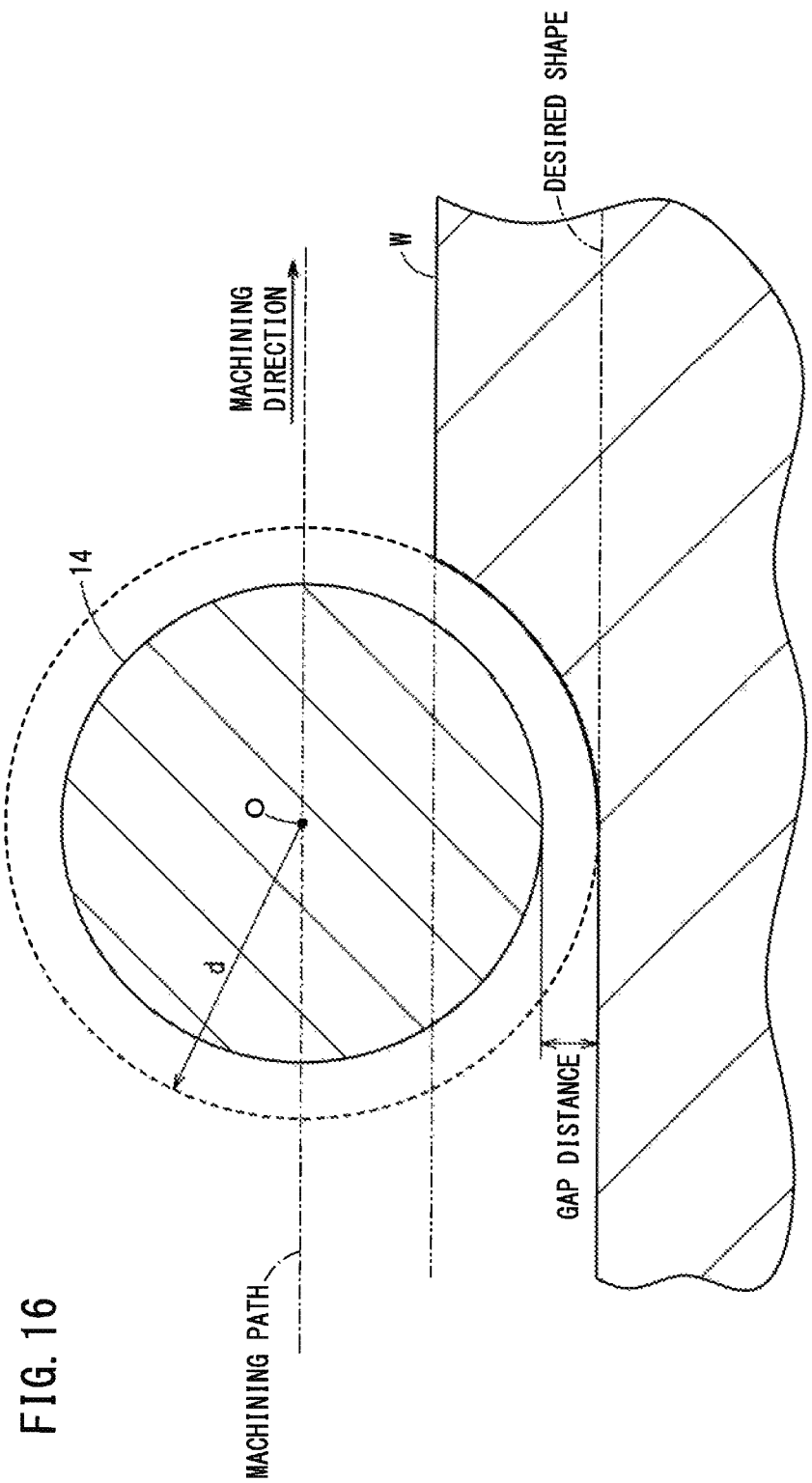
FIG. 16 is a sectional view illustrating a facing area in Modification 2.

FIG. 15 is a diagram for explaining a predetermined distance d used to define the facing area in Modification 2. FIG. 16 is a sectional view illustrating the facing area according to Modification 2. In the above-described embodiment, the facing area calculation unit 52 defines, as the facing area, the area of a surface of the workpiece W that lies within the maximum dischargeable distance from the center axis O of the wire electrode 14, but the definition of the facing area is not limited to this. FIG. 15 shows the same relationship between the distance from the center axis O of the wire electrode 14 to the workpiece W and the discharge probability, as in FIG. 4. As to the discharge probability, there is a discharge probability threshold below which the removal efficiency by electrical discharge greatly lowers. Therefore, in Modification 2, the predetermined distance d used to define the facing area is limited to a range of distance from the center axis O to the workpiece W, in which the discharge probability is equal to or higher than the threshold. Specifically, the predetermined distance d used when the facing area calculation unit 52 calculates, as the facing area, the area of a surface of the workpiece W that lies within the predetermined distance d from the center axis O, is limited to a range from d1 to d2 in FIG. 15. FIG. 16 shows the facing area defined by the distance d thus determined. This makes it possible to efficiently realize high-precision machining independent of the geometry of portions to be machined of the workpiece W.

It should be noted that the predetermined distance used when the facing area calculation unit 52 calculates, as the facing area, the area of a surface of the workpiece W that lies within the predetermined distance from the center axis O, may be arbitrarily determined, and the predetermined distance does not necessarily have to be limited to the above-described embodiment and Modification 2.

Modification 3

The above embodiment and Modifications 1 and 2 may be arbitrarily combined as long as no technical inconsistency occurs.

Invention Obtained from the Embodiment

The invention that can be grasped from the above embodiment will be described below.

First Invention

A wire electrical discharge machine (10) performs electrical discharge machining on a workpiece (W) by applying voltage across an electrode gap formed between a wire electrode (14) and the workpiece (W) to thereby generate electrical discharge while moving the wire electrode (14) relative to the workpiece (W) along a path specified by a machining program (46). The wire electrical discharge machine (10) includes: a voltage detector (42) configured to detect a gap voltage across the electrode gap; a facing area calculation unit (52) configured to calculate, as a facing area, the area of a surface of the workpiece (W) that is contained within a predetermined distance from the center axis (O) of the wire electrode (14); an axis feed rate determination unit (54) configured to determine an axis feed rate based on the value of the gap voltage detected by the voltage detector (42), and the facing area; and a movement control unit (50) configured to perform control so that the wire electrode (14) moves relative to the workpiece (W) at the axis feed rate.

This enables high-precision machining regardless of the geometry of a portion to be machined of the workpiece (W).

The axis feed rate determination unit (54) may be configured to determine the axis feed rate so that the average of the gap voltage values becomes a target voltage having a predetermined value, and may be configured to, when the value of facing area changes from the value calculated for the path of a straight line, compensate the gap voltage value so that the gap voltage value increases or decreases in accordance with the amount of change of the facing area and determine the axis feed rate so that the average of the compensated gap voltage values becomes the target voltage. This makes it possible to determine an appropriate axis feed rate in accordance with the facing area.

The axis feed rate determination unit (54) may be configured to determine the axis feed rate so that the average of the gap voltage values becomes a target voltage, and may be configured to, when the value of facing area changes from the value calculated for the path of a straight line, compensate the target voltage so that the target voltage increases or decreases in accordance with the amount of change of the facing area and determine the axis feed rate so that the average of the gap voltage values becomes the compensated target voltage. This makes it possible to determine an appropriate axis feed rate in accordance with the facing area.

The wire electrical discharge machine (10) may further includes a discharge control unit (56) configured to apply voltage pulses across the electrode gap at intervals of a pause time. The discharge control unit (56) may be configured to change the pause time in accordance with change in the facing area. With this configuration, the frequency of receiving discharge repulsive force can be reduced, so that the wire electrode (14) can be prevented from being displaced from the right place.

The predetermined distance may be defined as the maximum distance at which electrical discharge occurs at the electrode gap.

The predetermined distance may be defined as a distance at which the probability of occurrence of electrical discharge at the electrode gap is equal to or greater than a threshold. This makes it possible to efficiently realize high-precision machining independent of the geometry of a portion to be machined of the workpiece (W).

The facing area calculation unit (52) may be configured to calculate the facing area based on the machining program (46).

Second Invention

A wire electrical discharge machining method performs electrical discharge machining on a workpiece (W) by applying voltage across an electrode gap formed between a wire electrode (14) and the workpiece (W) to thereby generate electrical discharge while moving the wire electrode (14) relative to the workpiece (W) along a path specified by a machining program (46). The wire electrical discharge machining method includes: a facing area calculation step (S1) of calculating, as a facing area, the area of a surface of the workpiece (W) that is contained within a predetermined distance from the center axis (O) of the wire electrode (14); an axis feed rate determination step (S2) of determining an axis feed rate based on the value of a gap voltage detected by a voltage detector (42) configured to detect the gap voltage across the electrode gap, and the facing area; and a movement control step (S3) of performing control so that the wire electrode (14) moves relative to the workpiece (W) at the axis feed rate.

This enables high-precision machining regardless of the geometry of a portion to be machined of the workpiece (W).

The axis feed rate determination step (S2) may determine the axis feed rate so that the average of the gap voltage values becomes a target voltage having a predetermined value, and when the value of the facing area changes from the value calculated for the path of a straight line, may compensate the gap voltage value so that the gap voltage value increases or decreases in accordance with the amount of change of the facing area and determine the axis feed rate so that the average of the compensated gap voltage values becomes the target voltage. This makes it possible to determine an appropriate axis feed rate in accordance with the facing area.

The axis feed rate determination step (S2) may determine the axis feed rate so that the average of the gap voltage values becomes a target voltage, and when the value of the facing area changes from the value calculated for the path of a straight line, may compensate the target voltage so that the target voltage increases or decreases in accordance with the amount of change of the facing area and determine the axis feed rate so that the average of the gap voltage values becomes the compensated target voltage. This makes it possible to determine an appropriate axis feed rate in accordance with the facing area.

The wire electrical discharge machining method may further include a discharge control step of applying voltage pulses across the electrode gap at intervals of a pause time. The discharge control step may change the pause time in accordance with change in the facing area. With this configuration, the frequency of receiving discharge repulsive force can be reduced, so that the wire electrode (14) can be prevented from being displaced from the right place.

The predetermined distance may be defined as the maximum distance at which electrical discharge occurs at the electrode gap.

The predetermined distance may be defined as a distance at which the probability of occurrence of electrical discharge at the electrode gap is equal to or greater than a threshold. This makes it possible to efficiently realize high-precision machining independent of the geometry of a portion to be machined of the workpiece (W).

The facing area calculation step (S1) may calculate the facing area based on the machining program (46).

The present invention is not particularly limited to the embodiments described above, and various modifications are possible without departing from the essence and gist of the present invention.

What is claimed is:

1. A wire electrical discharge machine for performing electrical discharge machining on a workpiece by applying voltage across an electrode gap formed between a wire electrode and the workpiece to thereby generate electrical discharge while moving the wire electrode relative to the workpiece along a path specified by a machining program, comprising:
a voltage detector configured to detect a gap voltage across the electrode gap; and
a processor configured to:
calculate, as a facing area, an area of a surface of the workpiece that is contained within a predetermined distance from a center axis of the wire electrode;
determine an axis feed rate based on a value of the gap voltage detected by the voltage detector, and the facing area; and
perform control so that the wire electrode moves relative to the workpiece at the axis feed rate.

2. The wire electrical discharge machine according to claim 1, wherein the processor is configured to determine the axis feed rate so that an average of the gap voltage values becomes a target voltage having a predetermined value, and is configured to, when a value of the facing area changes from a value calculated for the path of a straight line, compensate the gap voltage value so that the gap voltage value increases or decreases in accordance with an amount of change of the facing area and determine the axis feed rate so that the average of the compensated gap voltage values becomes the target voltage.

3. The wire electrical discharge machine according to claim 1, wherein the processor is configured to determine the axis feed rate so that an average of the gap voltage values becomes a target voltage, and is configured to, when a value of the facing area changes from a value calculated for the path of a straight line, compensate the target voltage so that the target voltage increases or decreases in accordance with an amount of change of the facing area and determine the axis feed rate so that the average of the gap voltage values becomes the compensated target voltage.

4. The wire electrical discharge machine according to claim 1, wherein the processor is configured to apply voltage pulses across the electrode gap at intervals of a pause time, and
wherein the processor is configured to change the pause time in accordance with change in the facing area.

5. The wire electrical discharge machine according to claim 1, wherein the predetermined distance is defined as a maximum distance at which electrical discharge occurs at the electrode gap.

6. The wire electrical discharge machine according to claim 1, wherein the predetermined distance is defined as a distance at which a probability of occurrence of electrical discharge at the electrode gap is equal to or greater than a threshold.

7. The wire electrical discharge machine according to claim 6, wherein the predetermined distance is from the center axis of the wire electrode and at which the probability of occurrence of electrical discharge at the electrode gap is equal to or greater than a threshold.

8. The wire electrical discharge machine according to claim 1, wherein the processor is configured to calculate the facing area based on the machining program.

9. The wire electrical discharge machine according to claim 1, wherein the processor is configured to calculate, as the facing area, the area of the surface of the workpiece within the predetermined distance from the center axis of the wire electrode,
wherein the processor is configured to determine the axis feed rate such that an average of the gap voltage coincides with a predetermined target voltage, and compensates the predetermined target voltage to increase or decrease according to a change of a calculated value of the facing area, and
wherein the axis feed rate is determined in accordance with a change in the facing area during a change of the path from a straight line shape to a corner shape.

10. A wire electrical discharge machining method for performing electrical discharge machining on a workpiece by applying voltage across an electrode gap formed between a wire electrode and the workpiece to thereby generate electrical discharge while moving the wire electrode relative to the workpiece along a path specified by a machining program, comprising:
calculating, as a facing area, an area of a surface of the workpiece that is contained within a predetermined distance from a center axis of the wire electrode;
determining an axis feed rate based on a value of a gap voltage detected by a voltage detector configured to detect the gap voltage across the electrode gap, and the facing area; and
performing control so that the wire electrode moves relative to the workpiece at the axis feed rate.

11. The wire electrical discharge machining method according to claim 10, further comprising applying voltage pulses across the electrode gap at intervals of a pause time to provide discharge control,
wherein the discharge control by applying voltage pulses changes the pause time in accordance with change in the facing area.

12. The wire electrical discharge machining method according to claim 10, wherein the predetermined distance is defined as a maximum distance at which electrical discharge occurs at the electrode gap.

13. The wire electrical discharge machining method according to claim 10, wherein the predetermined distance is defined as a distance at which a probability of occurrence of electrical discharge at the electrode gap is equal to or greater than a threshold.

14. The wire electrical discharge machining method according to claim 10, wherein the the calculating, as the facing area, calculates the facing area based on the machining program.

15. The wire electrical discharge machining method according to claim 10, wherein the determining of the axis feed rate determines the axis feed rate so that an average of the gap voltage values becomes a target voltage having a predetermined value, and when a value of the facing area changes from a value calculated for the path of a straight line, compensates the gap voltage value so that the gap voltage value increases or decreases in accordance with an amount of change of the facing area and determines the axis feed rate so that the average of the compensated gap voltage values becomes the target voltage.

16. The wire electrical discharge machining method according to claim 10, wherein the determining of the axis feed rate determines the axis feed rate so that an average of the gap voltage values becomes a target voltage, and when a value of the facing area changes from a value calculated for the path of a straight line, compensates the target voltage so that the target voltage increases or decreases in accordance with an amount of change of the facing area and determines the axis feed rate so that the average of the gap voltage values becomes the compensated target voltage.

17. The wire electrical discharge machining method according to claim 10, wherein the calculating of the facing area comprises calculating the area of the surface of the workpiece within the predetermined distance from the center axis of the wire electrode,
   wherein the determining of the axis feed rate includes determining the axis feed rate such that an average of the gap voltage coincides with a predetermined target voltage, and compensates the predetermined target voltage to increase or decrease according to a change of a calculated value of the facing area, and
   wherein the axis feed rate is determined in accordance with a change in the facing area during a change of the path from a straight line shape to a corner shape.

18. A non-transitory computer readable medium storing a machining program comprising computer executable instructions for a wire electrical discharge machine for performing electrical discharge machining on a workpiece by applying voltage across an electrode gap formed between a wire electrode and the workpiece to thereby generate electrical discharge while moving the wire electrode relative to the workpiece along a path specified by the machining program, the computer executable instructions comprising:
   calculating, as a facing area, an area of a surface of the workpiece that is contained within a predetermined distance from a center axis of the wire electrode;
   determining an axis feed rate based on a value of a gap voltage detected by a voltage detector across the electrode gap, and the facing area; and
   performing control so that the wire electrode moves relative to the workpiece at the axis feed rate.

19. The wire electrical discharge machining method according to claim 18, wherein the determining of the axis feed rate determines the axis feed rate so that an average of the gap voltage values becomes a target voltage having a predetermined value, and when a value of the facing area changes from a value calculated for the path of a straight line, compensates the gap voltage value so that the gap voltage value increases or decreases in accordance with an amount of change of the facing area and determines the axis feed rate so that the average of the compensated gap voltage values becomes the target voltage, and
   wherein the axis feed rate is determined in accordance with a change in the facing area during a change of the path from a straight line shape to a corner shape.

20. The wire electrical discharge machining method according to claim 18, wherein the determining of the axis feed rate determines the axis feed rate so that an average of the gap voltage values becomes a target voltage, and when a value of the facing area changes from a value calculated for the path of a straight line, compensates the target voltage so that the target voltage increases or decreases in accordance with an amount of change of the facing area and determines the axis feed rate so that the average of the gap voltage values becomes the compensated target voltage, and
   wherein the axis feed rate is determined when the path changes from a straight line shape to a corner shape.

\* \* \* \* \*